US009680372B1

(12) United States Patent
Kellogg et al.

(10) Patent No.: US 9,680,372 B1
(45) Date of Patent: Jun. 13, 2017

(54) HOLD UP CONVERTER (71) Applicant: Rantec Power Systems, Inc., Los Osos, CA (US)

(72) Inventors: Bryan Kellogg, Templeton, CA (US); Steve Isakson, Atascadero, CA (US); Uditha D. Jayakody, Los Osos, CA (US); Abdel Jabaieh, Los Osos, CA (US)

(73) Assignee: RANTEC POWER SYSTEMS, INC., Los Osos, CA (US)

( * ) Notice: Subject to any disclaimer, the term of this patent is extended or adjusted under 35 U.S.C. 154(b) by 5 days.

(21) Appl. No.: 14/537,779

(22) Filed: Nov. 10, 2014

(51) Int. Cl.
*G05F 1/563* (2006.01)
*H02M 3/07* (2006.01)
*G05F 3/08* (2006.01)

(52) U.S. Cl.
CPC ............... *H02M 3/07* (2013.01); *G05F 3/08* (2013.01)

(58) Field of Classification Search
CPC .......................................... H02M 2001/0045
USPC .................... 323/222, 225, 351, 266–289
See application file for complete search history.

(56) References Cited

U.S. PATENT DOCUMENTS

| | | | | | |
|---|---|---|---|---|---|
| 2,983,877 | A | * | 5/1961 | Broermann | G10H 5/07 331/112 |
| 3,319,005 | A | * | 5/1967 | Gaunt, Jr. | H04M 3/561 370/263 |
| 5,680,301 | A | * | 10/1997 | Oughton, Jr. | H02M 3/337 363/132 |
| 5,714,863 | A | * | 2/1998 | Hwang | H02M 3/158 320/166 |
| 6,465,991 | B1 | | 10/2002 | Chang | |
| 6,650,558 | B1 | * | 11/2003 | Pacala | H02M 3/3376 363/132 |
| 7,560,909 | B2 | * | 7/2009 | Coleman | H02M 3/156 323/222 |
| 7,855,466 | B2 | * | 12/2010 | Bax | B60L 11/123 290/40 C |
| 8,415,933 | B2 | * | 4/2013 | Loikkanen | G05F 1/618 323/225 |
| 9,000,690 | B2 | * | 4/2015 | Garg | B06B 1/0238 318/114 |
| 2004/0207373 | A1 | | 10/2004 | Muller et al. | |
| 2004/0264223 | A1 | * | 12/2004 | Pihlstrom | H02M 3/07 363/89 |

(Continued)

FOREIGN PATENT DOCUMENTS

EP    1 437 823 A1    7/2004
EP    2 360 826 A1    8/2011

*Primary Examiner* — Adolf Berhane
*Assistant Examiner* — Nusrat Quddus
(74) *Attorney, Agent, or Firm* — Hickman Palermo Becker Bingham LLP (57) ABSTRACT A hold-up converter or other electronic circuit comprises a first switch configured to perform a first switching function in a first operation mode and to act as a first diode in a second operation mode. The electronic circuit further comprises a second switch configured as a second diode in the first operation mode and that performs a second switching function in the second operation mode. A hold-up capacitor is electronically coupled to the first switch and the second switch such that the hold-up capacitor charges in the first operation mode based, at least in part, on the first switching function and discharges in the second operation mode based, at least in part, on the second switching function.

19 Claims, 5 Drawing Sheets

(56) References Cited

U.S. PATENT DOCUMENTS

| | | | |
|---|---|---|---|
| 2007/0057731 A1* | 3/2007 | Le | H03F 3/189 |
| | | | 330/302 |
| 2011/0133664 A1* | 6/2011 | Imam | H05B 41/2887 |
| | | | 315/283 |
| 2011/0198931 A1* | 8/2011 | Ly | H02J 7/345 |
| | | | 323/282 |
| 2012/0319667 A1 | 12/2012 | Nair | |
| 2015/0102780 A1* | 4/2015 | Bauer | H02M 3/158 |
| | | | 320/166 |
| 2015/0229160 A1* | 8/2015 | Kawakami | H02J 9/061 |
| | | | 307/64 |

* cited by examiner

HOLD UP CONVERTER

FIELD OF THE DISCLOSURE

The present disclosure generally relates to power converter circuits, generally, and more specifically to techniques for holding up energy to protect against temporary power losses.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Hold-up capacitors are frequently used within power supplies to allow electronic systems to continue normal operation in the event of a temporary power loss. In order to manage hold-up energy, one approach is to use separate converters for charging and discharging the hold-up capacitor within the power supply. According to this approach, an input converter is responsible for receiving input energy from a power source and charging the hold-up capacitor. If the power source stops providing power, a separate output converter is responsible for discharging the hold-up capacitor to maintain operation to the electronic system.

In many cases, the input converter operates at a higher voltage level than the operational voltage level of the electronic system for which power is provided. The input converter may charge the hold-up capacitor more quickly at a higher voltage level, but additional circuitry may be required in the output converter to step-down the output voltage level as energy is discharged by the hold-up capacitor.

The two-converter approach is a simple and straightforward way to protect sensitive electronic systems against temporary power losses. Each converter is responsible for implementing different functions, increasing the modularity of the design. However, in order to perform their respective functions, each converter is implemented using different electronic components and layouts, consuming valuable space within the power supply and potentially increasing manufacturing costs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A hold-up converter or other electronic circuit is described herein that operates in a plurality of operation modes and allows bi-directional flow of energy between a hold-up capacitor and a bus. According to an embodiment, the hold-up converter uses the same electronic components in different modes of operation to charge and discharge hold-up energy. Thus, a single converter may perform the functions of both an input and output converter, reducing the number of electronic components used and the amount of space consumed by circuitry for managing hold-up energy.

In an embodiment, the hold-up converter comprises a first switch and a second switch. The first switch is configured to perform a first switching function in a first operation mode and to act as a first diode in a second operation mode. The hold-up converter further comprises a second switch that is configured as a second diode in the first operation mode and that is configured to perform a second switching function in the second operation mode. The hold-up capacitor is electronically coupled to the first switch and the second switch such that the hold-up capacitor is coupled to charge in the first operation mode based, at least in part, on the first switching function and discharge in the second operation mode based, at least in part, on the second switching function.

According to an embodiment, the hold-up converter includes an inductor that is electronically coupled to the first switch and the second switch. In the first operation mode, the inductor is configured to cause an input voltage level to increase while the first switch is performing the first switching function and the hold-up capacitor is charging. In the second operation mode, the inductor is configured to cause an output voltage level to decrease while the second switch is performing the second switching function and the hold-up capacitor is discharging.

According to an embodiment, the hold-up converter is integrated into a power supply system to maintain an output voltage level at a substantially constant level in the event of temporary loss in power from the source. While the hold-up converter is operating in a first operation mode, referred to herein as a "charge" or "boost" mode, the hold-up converter receives input energy from the power supply's bus, steps-up the input voltage level associated with the input energy received from the bus, and charges a hold-up capacitor. While the hold-up converter is operating in a second operation mode, referred to herein as a "discharge" or "buck" mode, the hold-up converter discharges stored energy from the hold-up capacitor, steps-down the stored energy from a discharge voltage level to an output voltage level, and outputs the discharged energy at the output voltage level to the electronic circuit via the bus. While operating in a third operation mode, herein referred to as an "idle" mode, the hold-up converter stops charging the hold-up capacitor and prevents the hold-up capacitor from discharging to substantially maintain a charge level of the hold-up capacitor.

According to an embodiment, the power supply system includes monitoring and control logic for switching the operation modes of the hold-up converter. While the hold-up converter is operating in charge or idle mode, the control logic monitors the voltage of the power supply's bus to detect a voltage drop outs and loss of power. If the voltage drops below a threshold level, then the control logic switches the operation mode from charge or idle mode to discharge mode. If the control logic subsequently detects that the voltage on the power supply's bus rises above the threshold level, then the control logic switches from discharge mode to charge mode thereby recharging the capacitor. The control logic may switch from charge mode to idle mode when the hold-up capacitor is fully charged or otherwise satisfies a threshold charge level.

Figure 1:
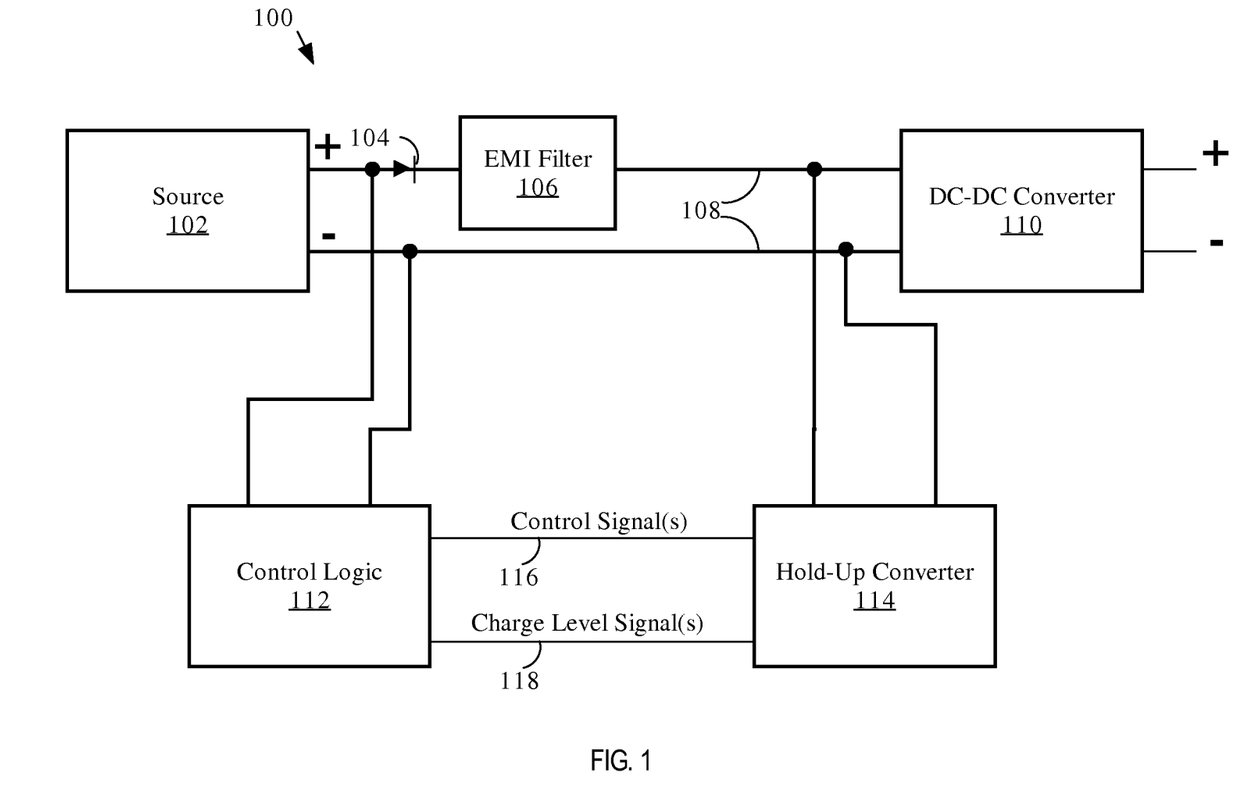
FIG. 1 is a block diagram depicting a power supply system that includes a hold-up converter for providing energy to an electronic circuit in the event of input bus drop-outs, according to an embodiment.

FIG. 1 is a block diagram depicting a power supply system that includes a hold-up converter for providing energy to an electronic circuit in the event of input bus drop-outs, according to an embodiment. System 100 generally comprises source 102, active blocking diode 104, EMI filter 106, bus 108, DC-DC converter 110 or some other electronic circuit, control logic 112, and hold-up converter 114.

Source 102 is electrically coupled, either directly or indirectly via bus 108, to active blocking diode 104, EMI filter 106, DC-DC converter 110, control logic 112, and hold-up converter 114. Source 102 represents a DC voltage source that maintains an unregulated voltage on bus 108 to supply power and energy to DC-DC converter 110. The voltage maintained on bus 108 is referred to herein as the input voltage given that energy flows from source 102 into DC-DC converter 110 when power is on. The voltage level of the input voltage may vary from implementation to implementation. For example, bus 108 may represent, without limitation, a +270 Volt ("V"), 28V, and/or +12V supply rail.

DC-DC converter 110 converts the voltage level of energy received via bus 108 from a first voltage level to a second voltage level. The output voltage of DC-DC converter 110 may be higher or lower than the input voltage, depending on the particular implementation. For example, DC-DC converter may be a buck converter for stepping down the input voltage or a boost converter for stepping up the input voltage.

Active blocking diode 104 is an electrical component that acts as an active and low-loss blocking diode. The anode terminal of active blocking diode 104 is coupled, via bus 108, to an output terminal of source 102. Active blocking diode 104 prevents energy from flowing to source 102 via bus 108. When hold-up converter 114 is active and discharging energy onto bus 108, for example, active blocking diode 104 blocks such discharged energy. This prevents hold-up converter 114 from charging source 102 during temporary power losses.

The input terminal of EMI filter 106 is coupled to the cathode terminal of active blocking diode 104. The output terminal of EMI filter 106 is coupled to the input terminal of DC-DC converter 110 via bus 108. EMI filter 106 filters out electromagnetic interference caused by electromagnetic induction and/or radiation emitted from source 102. For example, EMI filter 106 may remove common mode noise, differential mode noise, and/or other unwanted interference as electrical energy is propagated through bus 108.

A first input terminal of control logic 112 is coupled to bus 108 such that control logic 112 monitors the input voltage of bus 108 and detects voltage drop-offs. FIG. 1 depicts the first input terminal of control logic 112 coupled to bus 108 on the anode side of active blocking diode 104. However, the first input terminal may be coupled at any point along bus 108 including, without limitation, between the cathode side of active blocking diode 104 and the input terminal of EMI filter 106 or between the output terminal of EMI filter 106 and the input terminal of DC-DC converter 110. Thus, control logic 112 may monitor the input voltage at any point along bus 108. A second input terminal of control logic 112 is coupled to an output terminal of hold-up converter 114, and an output terminal of control logic 112 is coupled to an input terminal of hold-up converter 114. Control logic 112 receives charge level signal(s) 118 from hold-up converter 114 via the second input terminal. Based on the monitored input voltage and/or charge level signal(s) 118, control logic 112 generates and sends control signal(s) 116 via the output terminal to control the operation mode of hold-up converter 114.

Hold-up converter 114 includes a terminal that is coupled to bus 108 and implements a plurality of operation modes including, without limitation, charge mode, discharge mode, and idle mode. In charge mode, the terminal of hold-up converter 114 that is coupled to bus 108 receives energy from bus 108, whereas in discharge mode, the same terminal places energy back on bus 108. Thus, hold-up converter 114 supports bi-directional flow of energy to/from bus 108. In idle mode, energy does not flow into or out of hold-up converter 114, or does so at nominal levels.

Figure 2:
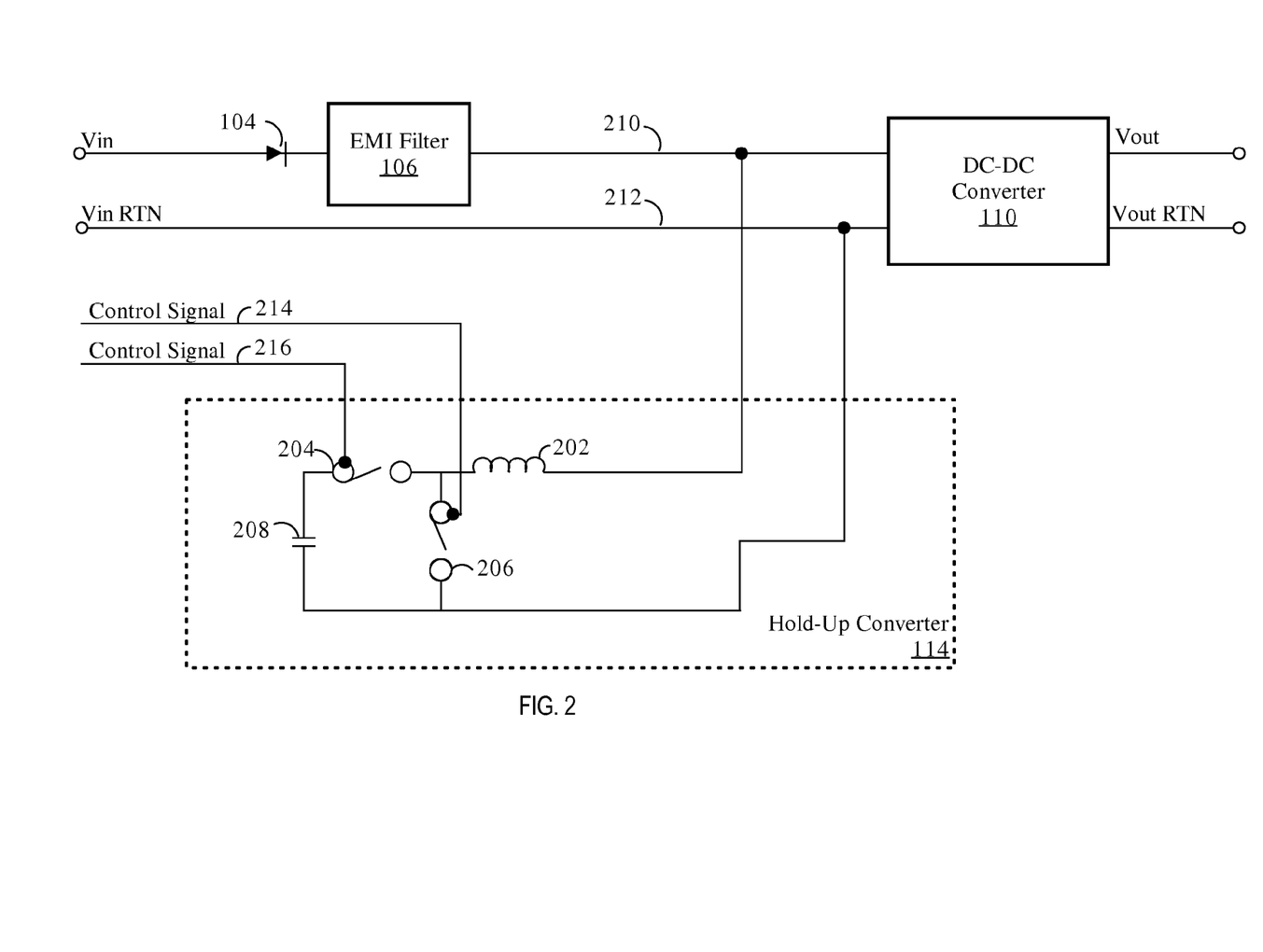
FIG. 2 is a simplified schematic diagram of a hold-up converter with two switches and an inductor for bi-directional control of a hold-up capacitor, according to an embodiment.

FIG. 2 is a simplified schematic diagram of a hold-up converter with two switches and an inductor for bi-directional control of a hold-up capacitor, according to an embodiment. Hold-up converter 114 generally comprises inductor 202, switch 204, switch 206, and hold-up capacitor 208. Inductor 202 has a first terminal that is coupled to bus line 210, which is the positive line of bus 108, and a second terminal that is coupled to both a first terminal of switch 204 and a first terminal of switch 206. In an embodiment, the first terminal for switch 204 is a throw on switch 204, and the first terminal for switch 206 is a pole on switch 206. A second terminal for switch 204 is coupled to a positive terminal of hold-up capacitor 208. A second terminal for switch 206 is coupled to a negative terminal of hold-up capacitor 208 and to bus line 212, which is the negative line of bus 108. Thus, hold-up capacitor 208 is coupled between the second terminal of switch 204 and the second terminal of switch 206. In an embodiment, the second terminal of switch 204 is a pole and the second terminal of switch 206 is a throw.

Switches 204 and 206 are electronic components that are configured to switch between different states based on control signals 214 and 216, respectively, including a switching state and a diode state. When a switch is in a switching state, the switch performs a switching function by periodically opening and closing in accordance with a switching frequency. The switching frequency may be determined by a clock signal and may be synchronized with other components within the power supply system. In the diode state, the switch allows electric current to pass in one direction and blocks current in the opposite direction. The type of switch that is used for switches 204 and 206 may vary from implementation to implementation. Examples include, without limitation metal-oxide-semiconductor field-effect transistors (MOSFETs), diode-connected bipolar junction transistors (BJTs), Insulated Gate Bipolar Transistor (IGBT), synchronous diodes, or some combination thereof.

Switch control terminals of switches 204 and 206 are coupled to control signals 214 and 216 respectively and are configured to switch between the different states, including the switching state and the diode state, in response to changes in control signals 214 and 216. Control logic 112 changes the control signals 214 and 216 based, in part, on the monitored input voltage on bus 108. Control logic 112 may further change control signals 214 and 216 based, in part, on a monitored charge level of hold-up capacitor 208. Techniques for changing control signals 214 and 216 and the operation mode of hold-up converter 114 are described in further detail below.

Figure 3A:
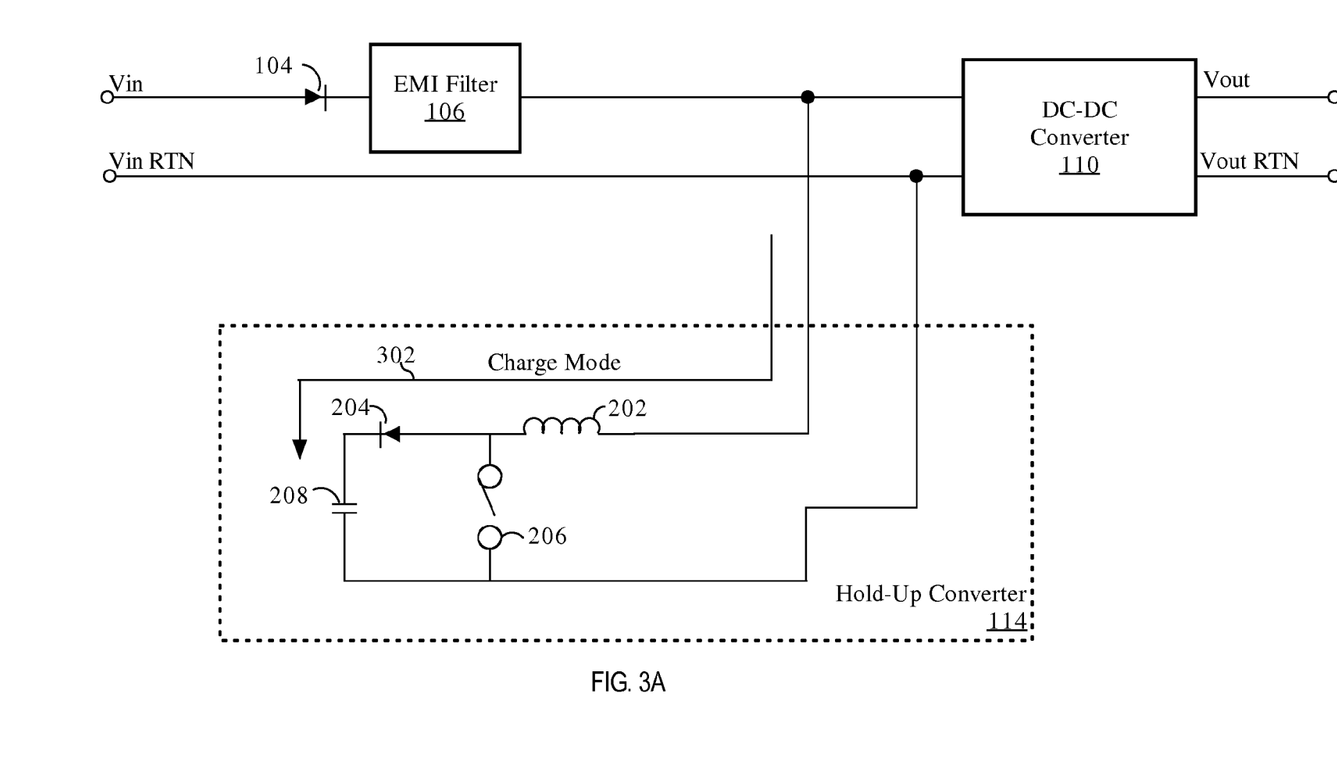
FIGS. 3A and 3B are simplified schematic diagrams depicting a hold-up converter in different operation modes, according to an embodiment.
Figure 3B:
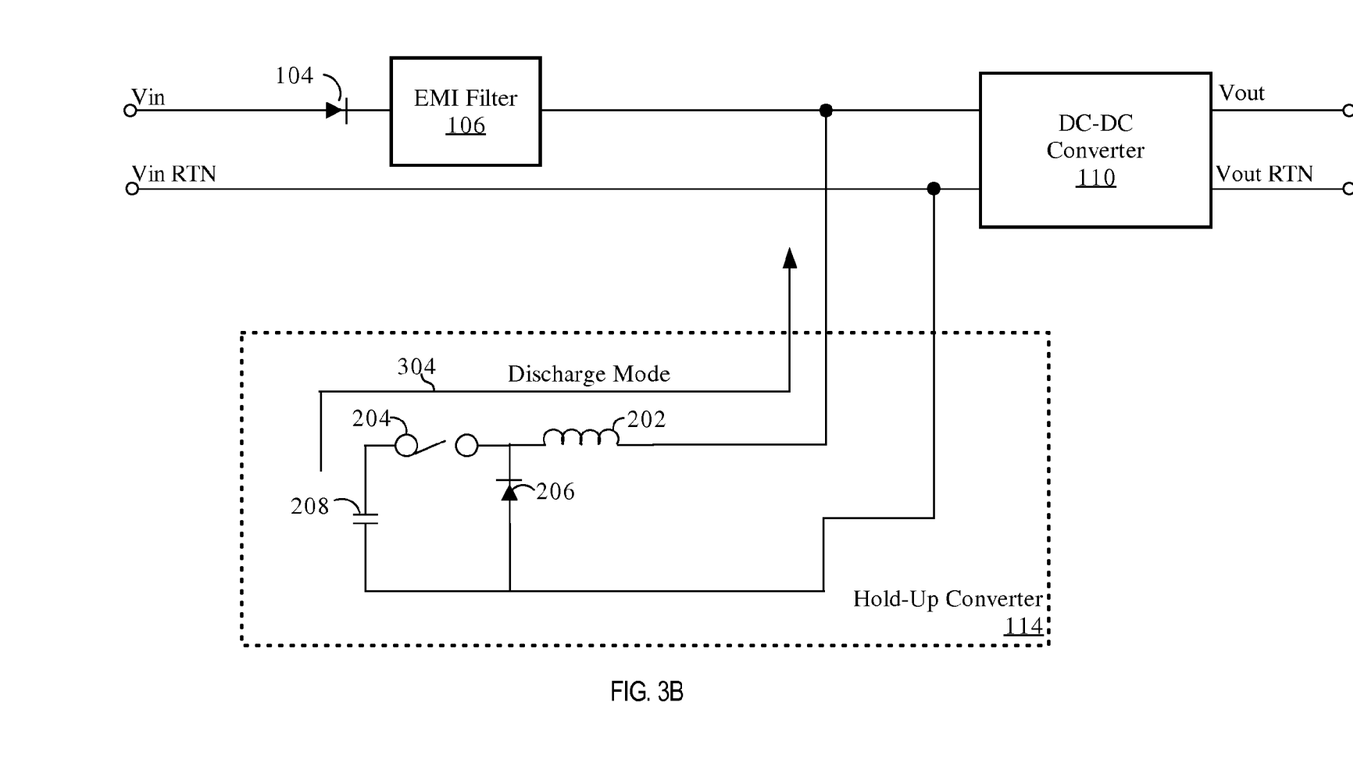

FIGS. 3A and 3B are simplified schematic diagrams depicting a hold-up converter in different operation modes, according to an embodiment. Referring to FIG. 3A, hold-up converter 114 is configured in charge mode. While operating in charge mode, switch 204 is configured as a diode such that switch 204 allows current and energy flow in the direction of hold-up capacitor 208 but prevents hold-up capacitor 208 from discharging energy through hold-up converter 114 and onto bus 108. Switch 206 performs a switching function by opening and closing at a switching frequency. While switch 206 is closed, current flows from bus 108 through inductor 202 causing inductor 202 to generate a magnetic field and store energy. When switch 206 opens, the inductor resists the change in current by discharging the stored energy, which causes the input voltage to be stepped up to a charging voltage level. The duty cycle of switch 206 may be configured such that inductor 202 never fully discharges while operating in charge mode thereby maintaining the charge voltage level above the voltage level of the input voltage. Accordingly, hold-up converter 114 steps-up the input voltage to charge hold-up capacitor 208, and additionally results in faster charge times. Arrow 302 illustrates the flow of current and energy through hold-up converter 114 while operating in charge mode. Current and energy flows from bus 108 through inductor 202 and switch 204 into hold-up capacitor 208, which stores the energy.

FIG. 3B illustrates a hold-up converter that is configured in discharge mode. While operating in this mode, switch 204 is configured as a switch that opens and closes at a switching frequency. Switch 206 is configured as a diode that blocks current from flowing when switch 204 is closed and allows current to flow when switch 204 is open. Inductor 202 produces opposing voltages in response to the changing currents caused by switch 204 opening and closing. The opposing voltage steps down the voltage level of energy discharged from hold-up capacitor 208. Energy is output from hold-up converter 114 onto bus 108 at the stepped down voltage level, which substantially matches the voltage level maintained by source 102 on bus 108 while hold-up converter 114 is operating in charge mode. Thus, in discharge mode, hold-up converter 114 maintains the voltage level of the input voltage to DC-DC converter 110 at a substantially constant level for a period of time as hold-up capacitor 208 is discharging. By maintaining the input voltage of DC-DC converter 110 at a substantially constant level, DC-DC converter 110 remains operational, and the output voltage of DC-DC converter 110 may also be maintained at a substantially constant level. Arrow 304 illustrates the flow of current and energy through hold-up converter 114 while operating in charge mode. Current and energy flows out of hold-up capacitor through switch 204 while switch 204 is closed and through switch 206 when switch 204 is open. The energy then flows through inductor 202, onto bus 108, and into DC-DC converter 110.

In idle mode, hold-up converter 114 maintains the charge level of hold-up capacitor 208 without taking energy from or discharging energy to bus 108. In order to maintain the charge level of hold-up capacitor 208, switches 204 and 206 are maintained in an open state. This prevents energy from flowing to or from hold-up capacitor 208, although energy may slowly leak from hold-up capacitor 208.

Figure 4:
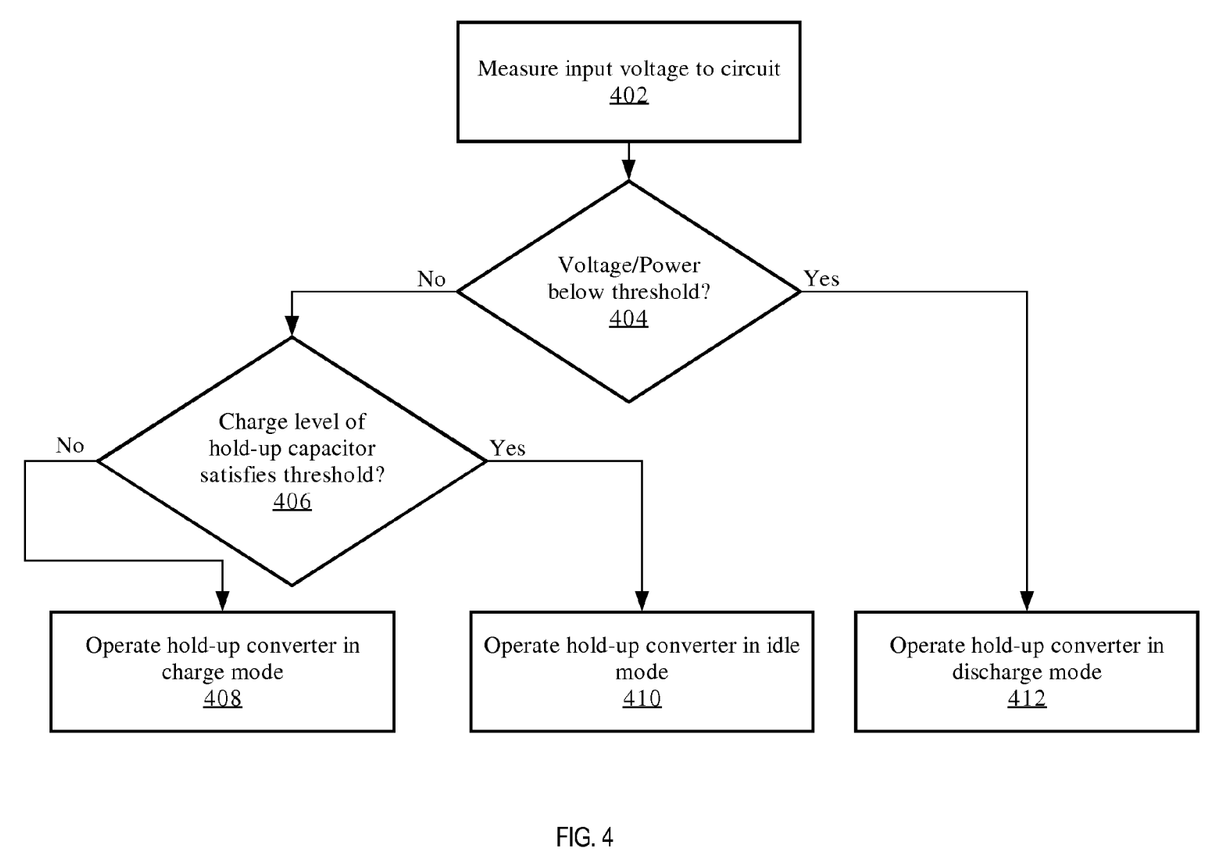
FIG. 4 is a flowchart depicting a process for switching between different operation modes implemented by a hold-up converter, according to an embodiment.

FIG. 4 is a flowchart depicting a process for switching between different operation modes implemented by a hold-up converter, according to an embodiment. In block 402, control logic 112 measures an input voltage to DC-DC converter 110 or another electronic circuit that is powered by voltage source 102.

In block 404, control logic 112 determines whether the voltage on bus 108 has fallen below a threshold. In the event of a power failure, for instance, the voltage may drop to zero or close to zero. The voltage threshold that triggers a change in operation mode may vary from implementation to implementation. In an embodiment, the threshold is based on a percentage of the input voltage normally maintained by source 102. For example, if the input voltage on bus 108 falls more than fifty percent, then control logic may switch operation modes as described further herein.

If the voltage has dropped below a threshold, then in block 412 control logic 112 changes or otherwise configures the control signals to operate hold-up converter 114 in discharge mode. In discharge mode, control signal 214 configures switch 204 in the switching state, and control signal 216 causes switch 206 to perform a diode function. Hold-up converter 114 is operated in discharge mode until voltage on bus 108 returns to the threshold level.

If, at block 404, the voltage has not dropped below a threshold or has returned to a threshold level, then in block 406, control logic 112 determines whether the charge level of hold-up capacitor 208 satisfies a threshold. The threshold may vary from implementation to implementation. For example, the threshold level may be a certain percentage, such as 90% or 95%, of a final charged voltage supported by hold-up capacitor 208.

If the charge-level does not satisfy a threshold, then in block 408, control logic 112 operates hold-up converter 114 in charge mode. In charge mode, control signal 214 causes switch 204 to perform a diode function, and control signal 216 configures switch 206 in the switching state. Hold-up converter 114 is operated in charge mode until voltage on bus 108 falls below a threshold or hold-up capacitor 208 satisfies a threshold charge level.

If the charge-level satisfies the threshold, then in block 410, control logic 112 operates hold-up converter 114 in idle mode. In idle mode, control signal 214 causes switch 206 to remain open, stopping the switch from opening and closing according to the switching frequency. Switch 204 also remains in a functionally open state. Thus, hold-up converter 114 stops charging hold-up capacitor 208 and maintains its charge at a substantially constant level. This reduces the power consumed by hold-up converter 114. Hold-up converter 114 is operated in idle mode until the voltage on bus 108 falls below a threshold or the charge level of hold-up capacitor 208 falls below the threshold.

In an embodiment, control logic 112 initially operates hold-up converter 114 in charge mode while source 102 is functioning normally and providing power to DC-DC converter 110. Once hold-up capacitor 208 is fully charged, control logic 112 operates hold-up converter in idle mode to minimize power consumption. From idle mode, control logic 112 may briefly change back to charge mode once enough energy has leaked from hold-up capacitor 208 to maintain the charge of hold-up capacitor 208. When the input voltage drops below the threshold, control logic 112 changes from charge or idle mode to discharge mode. Thus, hold-up converter 114 outputs energy onto bus 108 to maintain the input voltage of DC-DC converter 110 at a relatively constant level. When power returns and the input voltage provided by source 102 satisfies the threshold, control logic 112 changes from discharge mode to charge mode to recharge hold-up capacitor 208. This cycle may continue to provide DC-DC converter 110 with continuous electricity in the event of temporary power losses, thereby maintaining DC-DC converter 110 operational.

The period of time for which hold-up converter 114 may provide energy to DC-DC converter 110 may vary from implementation to implementation based on a variety of factors including the input voltage, the inductor value, and the hold-up capacitance value. In an embodiment, the value of hold-up capacitor 208 ranges from 110 microfarads to 20,000 microfarads, and the value of inductor 202 ranges from 1 microhenry to 100 microhenries. Hold-up converter 114 may generally provide several milliseconds of power to DC-DC converter 110 before recharging, depending on the particular application.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A circuit comprising:
a first switch configured to perform a first switching function when the circuit is in a first operation mode and configured as a first diode when the circuit is in a second operation mode;
a second switch configured as a second diode when the circuit is in the first operation mode and configured to perform a second switching function when the circuit is in the second operation mode;
a hold-up capacitor coupled in series with the first switch and having two terminals, the first terminal coupled to a first contact of the first switch and the second terminal coupled to a first contact of the second switch;
wherein the hold-up capacitor is coupled to charge in the first operation mode based, at least in part, on the first switching function;
wherein the hold-up capacitor is coupled to discharge in the second operation mode based, at least in part, on the second switching function;
a single inductor having a first terminal that is connected to a power bus line of a bus and a second terminal that is connected to both a second contact of the first switch and a second contact of the second switch;
wherein the single inductor and the capacitor are coupled in series between the first bus line and a second bus line of the bus.

2. The circuit of claim 1, further comprising control logic that is configured to switch the circuit between a plurality of operation modes including the first operation mode and the second operation mode based on a voltage level of the bus.

3. The circuit of claim 2, wherein the control logic is configured to switch to the second operation mode in response to determining that the voltage level has fallen below a threshold.

4. The circuit of claim 2, wherein the control logic is configured to switch from the second operation mode to the first operation mode in response to determining that the voltage level has risen above a threshold.

5. The circuit of claim 1, further comprising a DC-DC converter that is configured to adjust a voltage level of an input voltage and control logic that switches between the first operation mode and the second operation mode to maintain the voltage level of the input voltage at a substantially constant level for a period of time in response to detecting a loss of electric power.

6. The circuit of claim 1, wherein the first switch and the second switch are configured not to perform a switching function in a third operation mode that substantially maintains a charge level of the hold-up capacitor.

7. A system comprising:
a bus coupled to an electric circuit;
a hold-up converter that implements a plurality of operation modes and is electronically coupled to the bus;
wherein the hold-up converter is configured in a first operation mode to receive input energy from the bus, to step-up an input voltage level associated with the input energy received from the bus, and to charge a hold-up capacitor;
wherein the hold-up converter is configured in a second operation mode to discharge stored energy from the hold-up capacitor, step-down the stored energy from a discharge voltage level to an output voltage level, and output the discharged energy at the output voltage level to the electric circuit via the bus;
wherein the hold-up converter includes a first switch that performs a first switching function when the hold-up converter is configured in the first operation mode and that acts as a diode when the hold-up converter is configured in the second operation mode;
wherein the hold-up converter includes a second switch that acts as a diode when the hold-up converter is configured in the first operation mode and that performs a second switching function when the hold-up converter is configured in the second operation mode;
wherein the hold-up capacitor is coupled in series with the first switch and has two terminals, a first terminal that is coupled to a first contact of the first switch and a second terminal that is coupled to a first contact of the second switch;
wherein the hold-up converter includes a single inductor having a first terminal that is connected to a power bus line of the bus and a second terminal that is connected to both a second contact of the first switch and a second contact of the second switch;
wherein the single inductor and the capacitor are coupled in series between the first bus line and a second bus line of the bus.

8. The system of claim 7, wherein the hold-up converter is configured in a third operation mode to stop charging the hold-up capacitor and to prevent the hold-up capacitor from discharging to substantially maintain a charge level of the hold-up capacitor.

9. The system of claim 7, further comprising control logic that is configured to switch between the plurality of operation modes including the first operation mode and the second operation mode based on a monitored voltage.

10. The system of claim 9, wherein the control logic is configured to switch to the second operation mode in response to determining that the monitored voltage has fallen below a threshold.

11. The system of claim 9, wherein the control logic is configured to switch from the second operation mode to the first operation mode in response to determining that the monitored voltage has risen above a threshold.

12. The system of claim 9, wherein the electric circuit is a DC-DC converter that is configured to adjust a voltage level of the energy, the system further comprising the DC-DC converter and control logic that is configured to switch between the first operation mode and the second operation mode to maintain the voltage level of the energy at a substantially constant level for a period of time in response to detecting a loss of electric power.

13. The system of claim 9, wherein the output voltage level in the second operation mode substantially matches the input voltage level in the first operation mode.

14. A method comprising:
switching between two or more operation modes implemented by a hold-up converter including a first operation mode and a second operation mode;
wherein in the first operation mode, the hold-up converter receives input energy, steps-up an input voltage level associated with the input energy, and charges a hold-up capacitor;
wherein in the second operation mode, the hold-up converter discharges stored energy from the hold-up capacitor, steps-down the stored energy from a discharge voltage level to an output voltage level, and outputs the discharged energy at the output voltage level;
wherein the hold-up converter includes a first switch that performs a first switching function when the hold-up converter is operating in the first operation mode and that acts as a diode when the hold-up converter is operating in the second operation mode;
wherein the hold-up converter includes a second switch that acts as a diode when the hold-up converter is operating in the first operation mode and that performs a second switching function when the hold-up converter is operating in the second operation mode;
wherein the hold-up capacitor is coupled in series with the first switch and has two terminals, a first terminal that is coupled to a first contact of the first switch and a second terminal that is coupled to a first contact of the second switch;
wherein the hold-up converter includes a single inductor having a first terminal that is connected to a power bus line of a bus and a second terminal that is connected to both a second contact of the first switch and a second contact of the second switch;
wherein the single inductor and the capacitor are coupled in series between the first bus line and a second bus line of the bus.

15. The method of claim 14, wherein switching between the two or more operation modes is based on a monitored voltage.

16. The method of claim 14, wherein the two or more operation modes further includes a third operation mode; wherein in the third operation mode, the hold-up converter stops charging the hold-up capacitor and prevents the hold-up capacitor from discharging to substantially maintain a charge level of the hold-up capacitor.

17. The method of claim 16, wherein the operation mode of the hold-up converter is switched from the first operation mode to the third operation mode in response to determining that the charge level of the hold-up capacitor satisfies a threshold.

18. The method of claim 14, wherein the operation mode of the hold-up converter is changed to the second operation mode in response to determining that a voltage level is below a threshold.

19. An electronic circuit comprising:
a DC voltage source coupled to a second circuit using a first bus line and a second bus line;
control logic having inputs coupled to the first bus line and the second bus line, and a first control signal and second control signal coupled to a hold-up converter that is coupled to the first bus line and the second bus line;
wherein the hold-up converter comprises:
a single inductor having two terminals comprising a first terminal that is connected to the first bus line and a second terminal that is connected to both a first contact of a first switch and a first contact of a second switch;
a capacitor coupled in series with the first switch and coupled between a second contact of the first switch and a second contact of the second switch, wherein the second contact of the second switch is coupled to the second bus line;
wherein the single inductor and the capacitor are coupled in series between the first bus line and the second bus line;
wherein the first control signal is coupled to a switch control of the first switch and the second control signal is coupled to a switch control of the second switch;
wherein each of the first switch and the second switch is configured to switch between a switching state and a diode state in response to changes in the first control signal and second control signal.

* * * * *